United States Patent
Ochi et al.

(10) Patent No.: US 7,201,703 B2
(45) Date of Patent: Apr. 10, 2007

(54) GEAR TYPE SPEED CHANGE UNIT CONTROL DEVICE, CONTROL METHOD, AND AUTOMOBILE

(75) Inventors: Tatsuya Ochi, Tokyo (JP); Toshimichi Minowa, Tokyo (JP); Takashi Okada, Tokyo (JP); Hiroshi Sakamoto, Tokyo (JP); Naoyuki Ozaki, Tokyo (JP); Mitsuo Kayano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 10/494,959

(22) PCT Filed: Nov. 7, 2002

(86) PCT No.: PCT/JP02/11596

§ 371 (c)(1),
(2), (4) Date: May 7, 2004

(87) PCT Pub. No.: WO03/040594

PCT Pub. Date: May 15, 2003

(65) Prior Publication Data

US 2004/0266585 A1    Dec. 30, 2004

(30) Foreign Application Priority Data

Nov. 8, 2001    (JP) .............................. 2001-342661

(51) Int. Cl.
*B60W 10/02* (2006.01)
*B60W 10/04* (2006.01)
(52) U.S. Cl. ...................................... 477/174; 477/180
(58) Field of Classification Search .................. 477/70, 477/174, 86, 180
See application file for complete search history.

(56) References Cited

U.S. PATENT DOCUMENTS

| | | | |
|---|---|---|---|
| 4,899,857 A * | 2/1990 | Tateno et al. | 477/73 |
| 5,433,282 A * | 7/1995 | Moroto et al. | 180/65.2 |
| 6,616,572 B2 * | 9/2003 | Suzuki | 477/86 |
| 6,675,668 B2 * | 1/2004 | Schamscha | 74/340 |
| 2001/0027691 A1 | 10/2001 | Kayano et al. | |
| 2005/0267665 A1 * | 12/2005 | Iwatsuki et al. | 701/70 |
| 2006/0172855 A1 * | 8/2006 | Pollak et al. | 477/70 |

FOREIGN PATENT DOCUMENTS

JP    61-256054    11/1986

(Continued)

OTHER PUBLICATIONS

Japanese Office Action dated Aug. 17, 2006.

*Primary Examiner*—Tisha Lewis
(74) *Attorney, Agent, or Firm*—Crowell & Moring LLP

(57) ABSTRACT

A control device for giving an existing gear type transmission a parking lock function to lock a vehicle; a control method thereof; and an automobile having an improved transmission. The gear type transmission comprises a gear type speed change mechanism (5) provided with a mesh type clutch (3), and a second friction clutch (4) installed between the shafts of the speed change mechanism to enable torque transfer during shifting. A parking demand detecting means (9) detects the driver's parking demand. And, when it detects the driver's parking demand, a control device (10) sends an instruction signal to an actuator to instruct the latter to engage both the mesh type clutch (3) and the second friction clutch (4).

6 Claims, 13 Drawing Sheets

FOREIGN PATENT DOCUMENTS

| | | |
|---|---|---|
| JP | 2-44525 | 3/1990 |
| JP | 2-80258 | 6/1990 |
| JP | 3-123153 | 12/1991 |
| JP | 6-265003 | 9/1994 |
| JP | 9-14431 | 1/1997 |
| JP | 09-295561 | 11/1997 |
| JP | 09-301003 | 11/1997 |
| JP | 2000-065199 | 3/2000 |
| JP | 2001-304353 | 10/2001 |
| JP | 2002-168333 | 6/2002 |

* cited by examiner

HYDRAULIC POWER SUPPLY

GEAR TYPE SPEED CHANGE UNIT CONTROL DEVICE, CONTROL METHOD, AND AUTOMOBILE

TECHNICAL FIELD

The present invention relates to a control device and a control method of the gear type transmission, and an automobile, and particularly to a device having the parking lock function to lock the vehicle especially when parking and a method thereof.

BACKGROUND ART

For instance, the parking lock device for the conventional gear type transmission is disclosed in the Japanese Patent Application Laid-Open No. 9-295561. Lock mechanism which has a lock lever which engages with the parking gear when the engine is stopped and disengages with the parking lock when the engine is operated, an actuator which operates this lock lever, and a control means which operates this lock mechanism are provided in the device described in this patent gazette. The lock mechanism is operated when the engine is at an off state, and the rotation of the parking gear is prevented automatically. Therefore, even when the operation of a side brake to the position where the vehicle is parked is uncertain, the vehicle can be prevented from moving in contradiction to the intention. There is a problem that the configuration of the transmission is complicated, and its weight is also increased because the parking lock device to lock the vehicle when parking must be newly provided with some components separately in the gear type transmission as mentioned above.

DISCLOSURE OF INVENTION

An object of the present invention is provide a control device and a control method of the gear type transmission which can lock the vehicle by using existing parts without providing the parking lock device with some components separately.

(1) To achieve said object, a control device of a gear type transmission of the present invention comprises two or more gear trains provided between an input shaft and an output shaft, a second friction clutch provided on at least one of said gear trains, and mesh type clutches provided on other gear trains, power being transferred through a first friction clutch from a motor. The control device further comprises a means which detects the parking demand given by driver, wherein the second friction clutch is engaged as well as mesh type clutch when the parking demand of said drive r is detected by said parking demand detecting means.

Preferably, the gear position where said mesh type clutch is engaged is changed over according to the inclination of the road where the vehicle is parked.

(2) To achieve said object, in a method of controlling a gear type transmission of the present invention, two or more gear trains is provided between an input shaft and an output shaft, a second friction clutch provided on at least one of said gear trains, and mesh type clutches provided on other gear trains, power being transferred through a first friction clutch from a motor. The control method further comprises the steps of detecting the parking demand given by a driver, and engaging the second friction clutch as well as mesh type clutch when the parking demand is detected.

Moreover, preferably, the gear position where said mesh type clutch is engaged is changed over according to the inclination of the road where the vehicle is parked.

In said (1) and (2), it becomes possible to lock the wheel by using the existing parts without providing the parking lock device with components separately by making the double engaging state by using existing parts in the gear type transmission.

BEST MODE FOR CARRYING OUT THE INVENTION

Figure 1A:
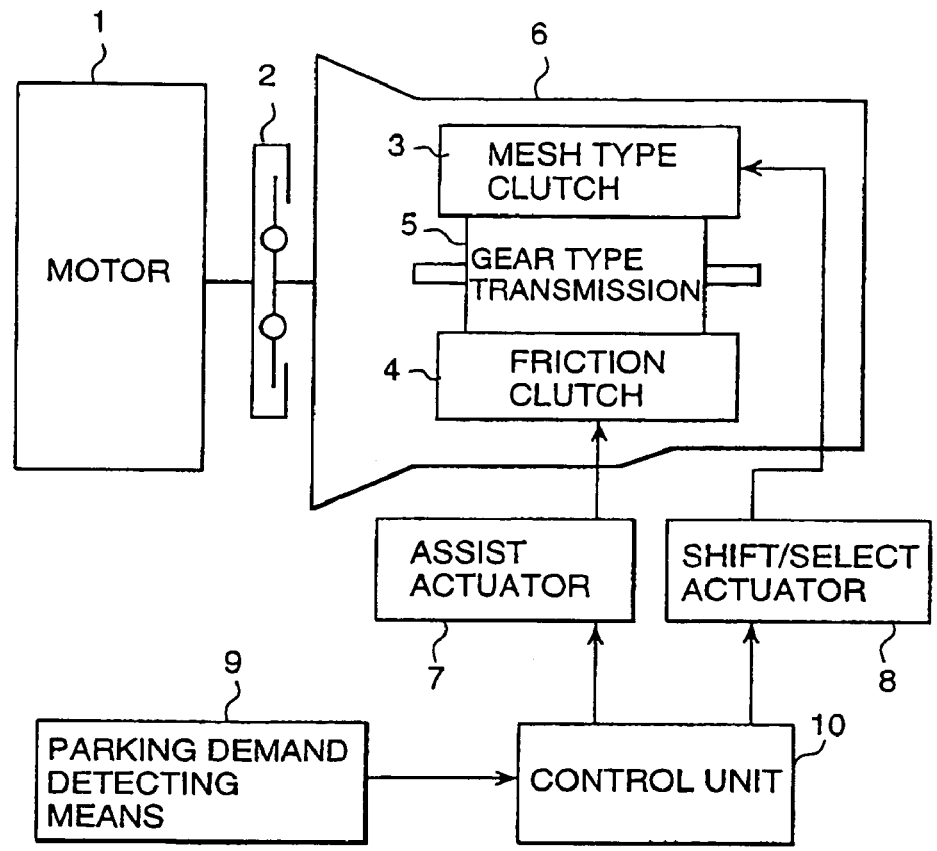
FIG. 1(a) is a block diagram showing whole configuration of a control device of a gear type transmission according to one embodiment of the present invention.
Figure 1B:
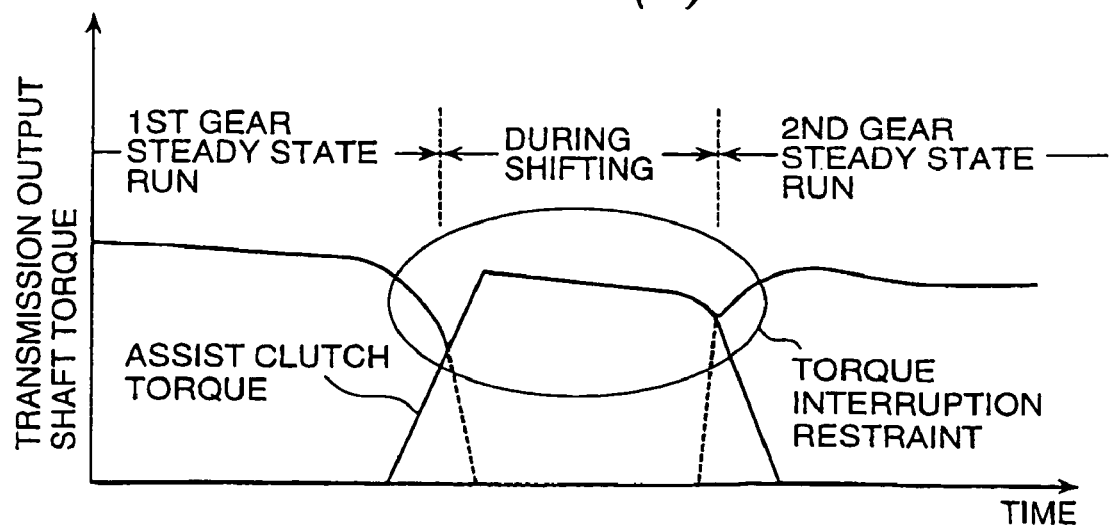
FIG. 1(b) is a timing chart showing the outline of the speed change performance of the gear type transmission.

Hereafter, the control device and the control method of the automatic transmission according to one embodiment of the present invention are explained by using FIG. 1–FIG. 10. FIG. 1(a) is a block diagram showing the whole configuration of the control device of the gear type transmission.

The torque generated by motor 1 is input to transmission 6 through first friction clutch 2 (referred as a start clutch). Transmission 6 comprises gear type speed change mechanism 5 which includes two or more gear trains, mesh type clutch 3 which switches the power transfer route of this gear trains, and second friction clutch 4 (referred as an assist clutch) which enables the torque transfer under shifting. Gear type speed change mechanism 5 comprises is an input shaft (103 in FIG. 2, for instance), counter shaft (120), an output shaft (104) and gear trains mounted on each shaft which are always engaged. Gear train (113, 114, 115, 116, 141, 142) of output shaft (104) is installed in idling respectively for output shaft (104). Said gear type speed change mechanism 5 receives the operation where the fixed gear of two or more gear trains (113, 114, 115, 116, 141, 142) is rotated in synchronization with output shaft (104) by mesh type clutch 3. As a result, the fixed transmission gear ratio will be set in gear type speed change mechanism 5. The change of the gear by mesh type clutch 3 will be explained later by using FIG. 4.

Here, the first friction clutch 2 is released in the conventional automatic manual transmission; and the power transfer from motor 1 is intercepted temporarily when the speed change. Meanwhile, said mesh type clutch 3 is operated by shift/selection actuator 8 driven electrically or with the oil pressure, and said gear train is selected to become the fixed gear position. Then the first friction clutch 2 is engaged again, and the speed change is completed. In such speed change operation, the uncomfortable feeling is given to the driver by generating the torque interruption during shifting. However, the second friction clutch 4 is engaged by controlling the control amount for the clutch by assist actuator 7 driven electrically or with oil pressure with the first friction clutch 2 engaged in the transmission shown in FIG. 1. Therefore, because the torque is transferred to the output shaft by the second friction clutch 4, the torque interruption under shifting is controlled, and an excellent speed change characteristic is achieved (Refer to FIG. 1(*b*)). Here, the fixed transmission gear ratio is set in gear type speed change mechanism 5 by engaging the second friction clutch 4 because the fixed gear wheel is engaged with the second friction clutch 4.

Parking demand detecting means 9 detects the intention of the driver who parks the vehicle. It is possible to detect the intention of the driver who starts said motor 1 from the state of the stop. As one example, there is a signal from the inhibitor switch output by working with the shift lever provided on the driver's seat side. This is described later by using FIG. 7(*a*) and FIG. 7(*b*). Control device 10 is a microcomputer into which a basic program which carries out the speed change operation based on the input signal and the program which achieves the parking lock are built. Control device 10 inputs the rotating speed of each shaft which composes gear type speed change mechanism 5, rotating speed Ni of the input shaft, rotating speed No of the output shaft, rotating speed Ne of motor 1, throttle opening TVO which controls the torque output from motors 1, etc. When driver's parking demand is detected by said parking demand detecting means 9, control device 10 makes assist actuator 7 and shift/selection actuator 8 work to make the second friction clutch 4 and mesh type clutch 3 engaged at the same time. As a result, the wheel can be locked by causing the state that two different gear trains engage with each other at the same time in gear type speed change mechanism 5, in a word, double engaging.

The parking lock of the vehicle can be achieved by using existing parts without adding new parts by adopting the configuration described above. Moreover, It is possible to make easily the transmission and to lighten it.

Figure 2:
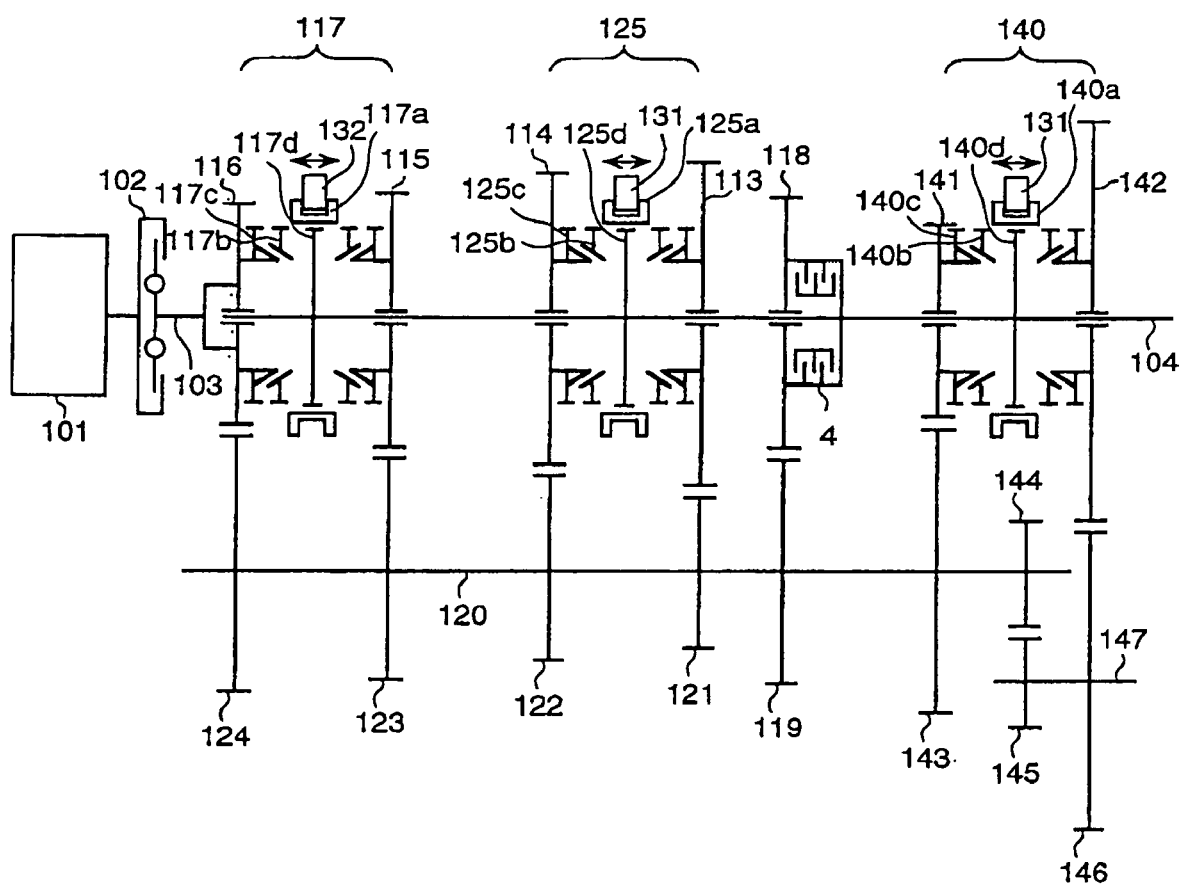
FIG. 2 is a schematic view showing the configuration of the gear type speed change mechanism.

Next, the gear type speed change mechanism of the automatic transmission according to this embodiment is explained by using FIG. 2. FIG. 2 is a schematic view showing the configuration of the gear type speed change mechanism. This figure is a schematic view of the speed change mechanism of a so-called front engine rear drive method where the driving wheel is a rear wheel. Motor 101, first friction clutch 102, input shaft 103 of gear type speed change mechanism 5, which doubles as the output shaft of the first friction clutch 102, output shaft 104 provided on the same shaft as input shaft 103, counter shaft 120 provided in parallel with output shaft 104, driven gears 113, 114, 115, 116, 141 and 142 of the 1st gear, the 2nd gear, the 3rd gear, the 4th gear, the 5th gear, and reverse gear are provided rotatably on output shaft 104. Counter shaft 120 is arranged in parallel with output shaft 104.

Drive gears 121, 122, 123, 124, 143 and 144 of the 1st gear, the 2nd gear, the 3rd gear, the 4th gear, the 5th gear, and the reverse gear are provided on counter shaft as one body, which engage with each gear 113, 114, 115, 116, 141 and 142. Similarly, idle gears 145 and 146 are provided on idling shaft 147 arranged in parallel as one body. Idle gear 145 always engages with drive gear 144 at said reverse gear position. Moreover, idle gear 146 always engages with driven gear 142 at said reverse gear position.

Further, two adjoining driven gears 113, 114 selectively engage with output shaft 104 with the 1st gear-the 2nd gear mesh type clutch 125 which comprises sleeve 125*a*, synchronizer ring 125*b*, gear spline 125*c*, and clutch hub 125*d*. Moreover, driven gears 115, 116 selectively engage with output shaft 104 with the 3rd gear-the 4th gear mesh type clutch 117 which comprises sleeve 117*a*, synchronizer ring 117*b*, gear spline 117*c*, and clutch hub 117*d*. In addition, driven gears 141,142 selectively engage with output shaft 104 with the 5th gear-reverse gear mesh type clutch 140 which comprises sleeve 140*a*, synchronizer ring 140*b*, gear spline 140*c*, and clutch hub 140*d*.

Thus, the 1st gear-the 2nd gear mesh type clutch 125 is moved to the driven gear 113 side with the speed change operation mechanism, and engaged with output shaft 104. As a result, the rotation of input shaft 103 is decelerated most with gears 113, 121, and transmitted to output shaft 104. Finally, the 1st gear is obtained. In a similar way, the 1st gear-the 2nd gear mesh type clutch 125 is engaged with driven gear 114 side, and the 2nd gear is obtained. The 3rd gear-the 4th gear mesh type clutch 117 is engaged with driven gear 115 or 116, and the 3rd gear or 4th gear is obtained. The 5th gear-the mesh type clutch 140 is engaged with driven gear 141 or 142, and the 5th gear or the reverse gear is obtained.

Further, to control the torque interruption during shifting, the second friction clutch 4 is provided on output shaft 104. The multiplate wet clutch is used for the second friction clutch 4. Power is transmitted from the assist drive gear 119 provided on counter shaft 120 to output shaft 104 through assist driven gear 118 provided on output shaft 104 as the control amount given to the clutch is increased. Moreover, the gear ratio of said assist drive gear 119 and driven gear 118 is substantially set to the 3. 5th gear. The second friction clutch 4 is made to work and the gear shock is reduced in the 1st–2nd speed change, the 2nd–3rd speed change, the 3rd–2nd speed change, and the 2nd–1st speed change where the gear shock by said torque interruption is large.

Here, It becomes possible to cause the double engaging in the gear type transmission and lock the wheels by engaging any one of said mesh type clutches 125,117 and 140 to form the fixed gear position, and engaging the second friction clutch 4. As a result, achieving the parking lock of the vehicle without adding new parts becomes possible. Moreover, It is possible to make easily the transmission and to lighten it.

Figure 3:
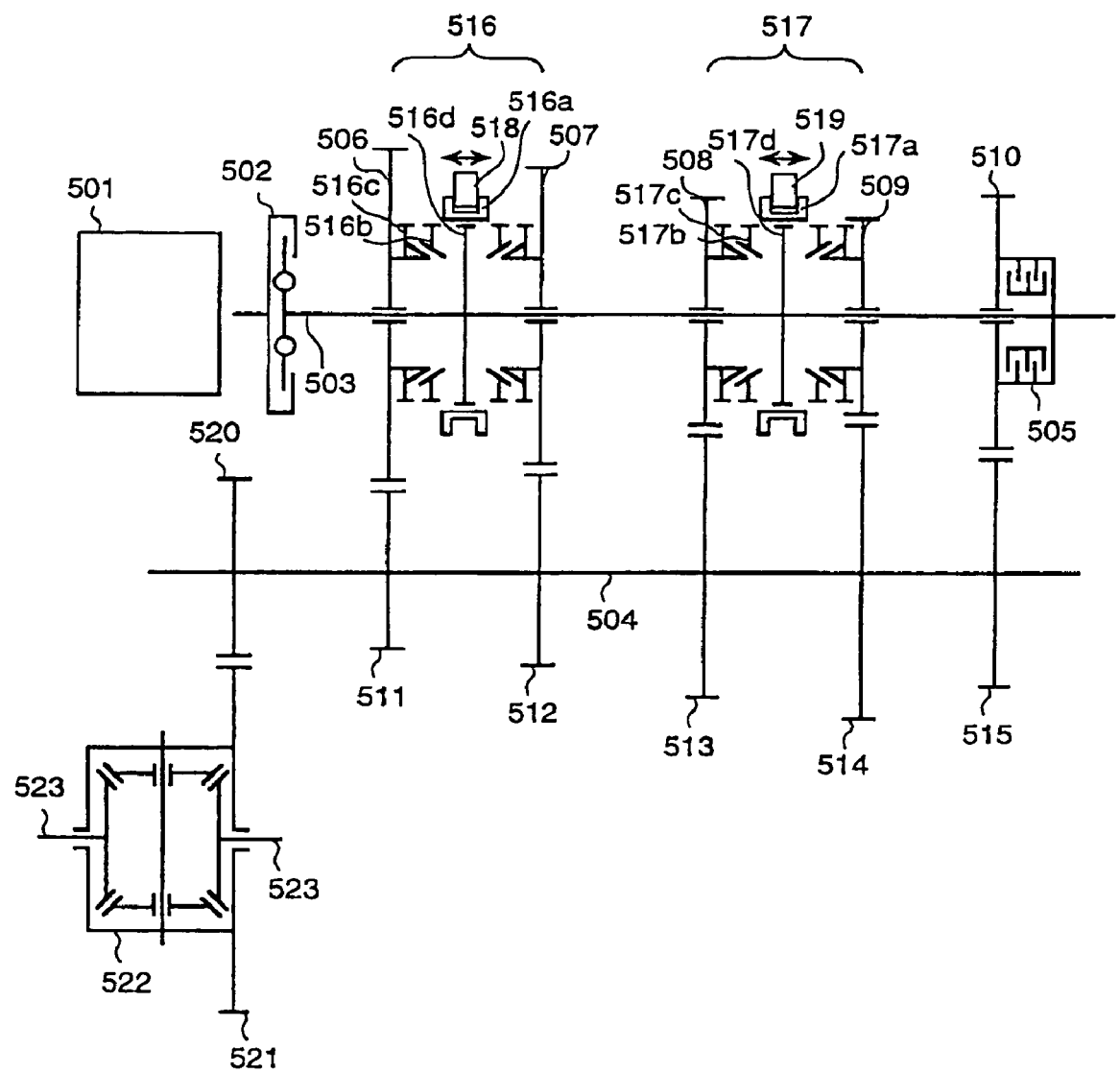
FIG. 3 is a schematic view showing the configuration of the gear type speed change mechanism.

FIG. 3 is a schematic view showing the configuration of the gear type speed change mechanism, the schematic view of the speed change mechanism of a so-called FF method in which driving wheels become front wheels. Motor 101 and gear type speed change mechanism 5 are laid out sideways to the traveling direction of the vehicle in the engine room in case of the front engine front drive method. Therefore, the state of the 3rd gear is formed by installing the second friction clutch in the gear train of the 3rd gear to engage it completely because the installing space is restricted compared with the front engine rear drive method. As a result, omitting the synchronizer ring of the 3rd gear and the gear train corresponding to 3. 5th ear becomes possible, and the configuration of the transmission is miniaturized.

Concretely, There are provided motor 501, the first friction clutch 502, Input shaft 503 of gear type speed change mechanism 5 which doubles output shaft of the first friction clutch 502, drive gear 506, 507, 508, and 509 for the 1st gear, the 2nd gear, the 4th gear and the 5th gear provided on input shaft 503 rotatably, and output shaft 504 arranged in parallel with input shaft 503. In addition, there are provided therein as one body driven gear 511, 512, 513, and 514 for the 1st gear, the 2nd gear, the 4th gear, and the 5th gear that always engage with said drive gear 506, 507, 508 and 509. Two adjoining drive gears 506, 507 are engaged with input shaft 503 selectively with the 1st gear-the 2nd gear mesh type clutch 516 of well-known configuration which comprises sleeve 516a, synchronizer ring 516b, gear spline 516c, and clutch hub 516d. Similarly, drive gears 508, 509 is selectively engaged with input shaft 503 with the 4th gear-the 5th gear mesh type clutch 517 which comprises sleeve 517a, synchronizer ring 517b, gear spline 517c, and clutch hub 517d. Similarly, the drive gear for the reverse gear position not shown in figure is selectively engaged with input shaft 503 with the reverse gear mesh type clutch. Thereby, the 1st gear-the 2nd gear mesh type clutch 516 is moved to drive gear 506 side with the speed change operation mechanism, and is engaged with input shaft 503. As a result, the rotation of input shaft 503 is decelerated most with gear 506, 511, and transmitted to output shaft 504 to obtain the 1st gear. Similarly, the 1st gear-the 2nd gear mesh type clutch 516 is engaged with drive gear 507, and the 2nd gear is obtained. The 4th gear-the 5th gear mesh type clutch 517 is engaged with the side of drive gear 508 or 509, and the 4th gear or the 5th gear is obtained. The reverse gear mesh type clutch not shown in figure is engaged with the reverse gear position drive gear, and the reverse gear is obtained. Drive gear 510 is provided on input shaft 503 rotatably. The second friction clutch 505 is engaged with this drive gear 510. As the control amount is increased, the power is transmitted to output shaft 504 through driven gear 515. Therefore, the torque interruption under shifting can be controlled as described in FIG. 2. Moreover, the 3rd gear is obtained by completely engaging with the second friction clutch 505, and two functions of the torque assist and the 3rd gear steady state run can be achieved. Output shaft 504 has drive gear 520 which always engages with ring gear 521 of differential device 522. The power is transmitted to right and left axle shafts 523 through this differential device 522, and the front wheels of the vehicle are driven. Here, It becomes possible to cause the double engaging in the gear type transmission and lock the wheels by engaging any one of said mesh type clutches 516, 517 and mesh type clutch not shown to form the fixed gear position, and engaging the second friction clutch 505. As a result, achieving the parking lock of the vehicle without adding new parts becomes possible even in the front engine front drive method for which the miniaturization is necessary.

Figure 4:
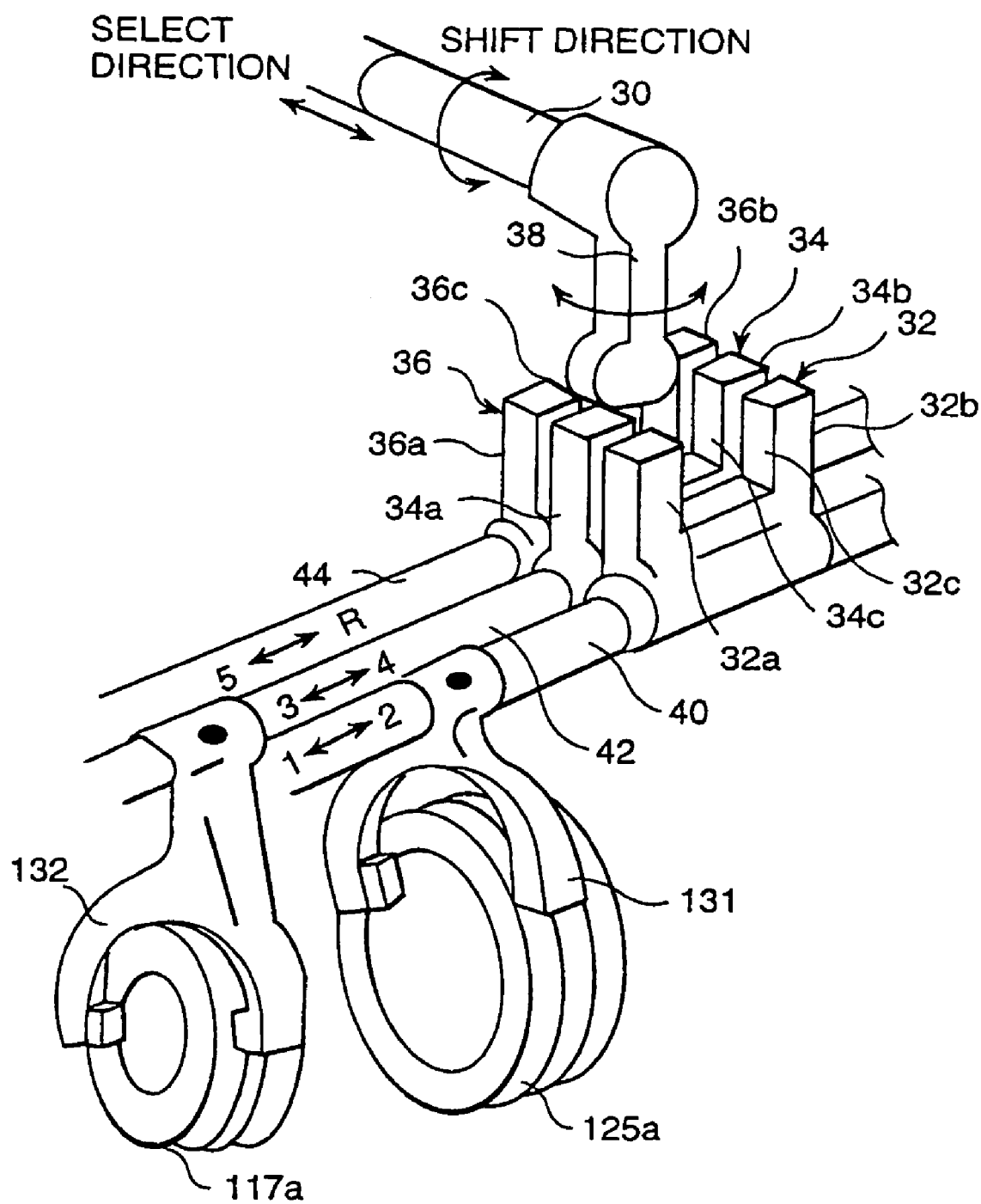
FIG. 4 is a perspective view of the speed change operation mechanism used for the gear type transmission.
Figure 5:
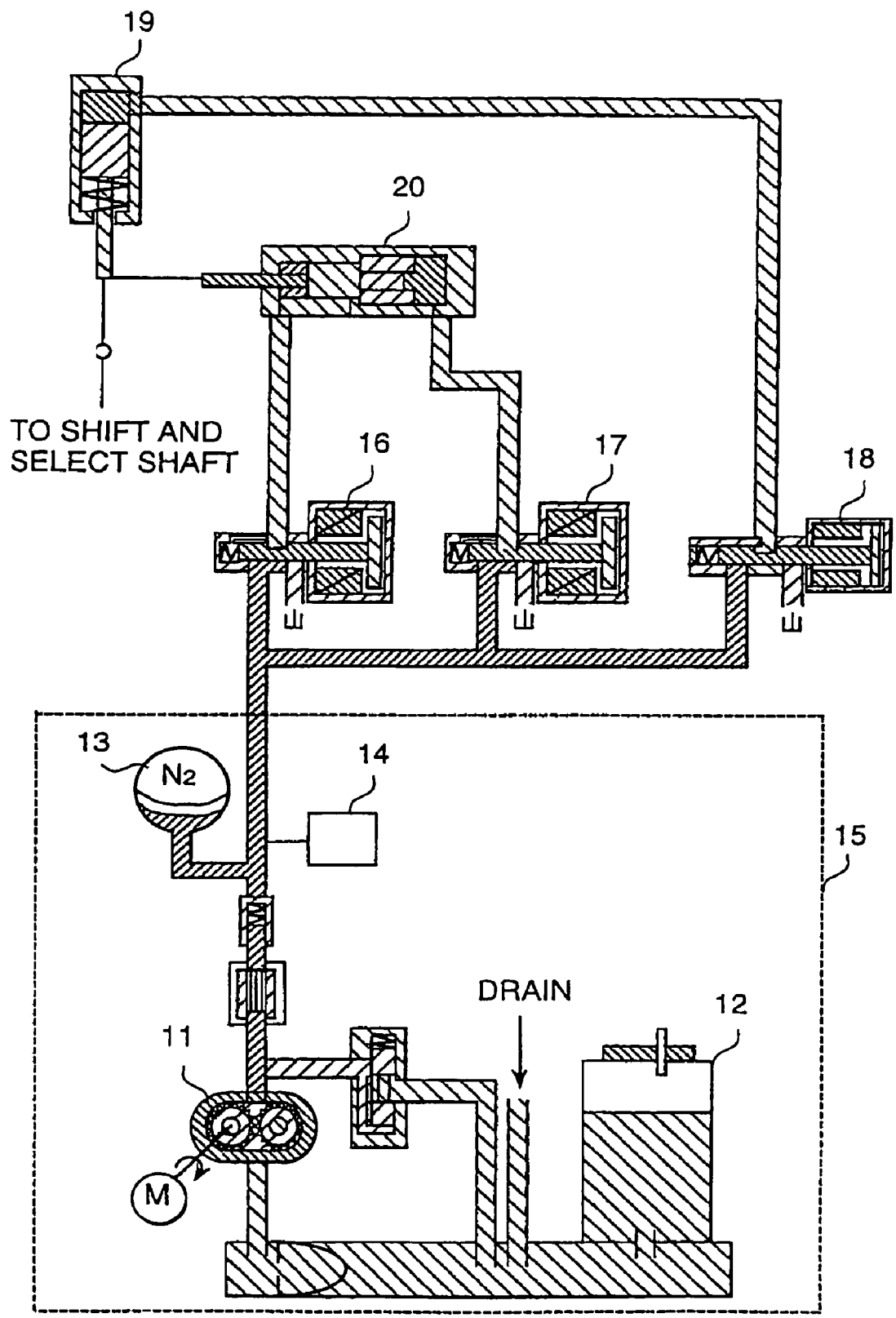
FIG. 5 is a block diagram showing the configuration of shift/select actuator used for the gear type transmission.

Next, the speed change operation mechanism which selects the gear train by the operation of the mesh type clutch in the gear type speed change mechanism according to the present embodiment is explained by using FIG. 4 and FIG. 5. FIG. 4 is a perspective view of the speed change operation mechanism used for the gear type transmission. Shift and select shaft 30 moved in an axial direction when selecting and turned when shifting is provided as shown in FIG. 4. Moreover, shift and select lever 38 selectively engaged with 1st gear and 2nd gear shift yoke 32, 3rd and 4th gear shift yoke 34, and 5th gear and reverse shift yoke 36 is provided on this shift and select shaft 30 as each gear shift yoke. The 1st gear and 2nd gear engaging ditch 32c for engaging shift and select lever 38 by 1st gear engaging flange 32a and 2nd gear engaging flange 32b are formed for 1st gear and 2nd gear shift yoke 32. The 3rd gear and 4th gear engaging ditch 34c for engaging shift and select lever 38 by 3rd gear engaging flange 34a and 2nd gear engaging flange 34b are formed for 3rd gear and 4th gear shift yoke 34. The 5th gear and reverse gear engaging ditch 36c for engaging shift and select lever 38 by 5th gear engaging flange 36a and reverse gear engaging flange 36b are formed for 5th gear and reverse gear shift yoke 36.

Moreover, 1st gear and 2nd gear shift yoke 32, 3rd and 4th gear shift yoke 34, and 5th gear and reverse gear shift yoke 36 are fixed on lowspeed side shift shaft 40, high-speed side shift shaft 42, and highest speed side shift shaft 44 supported in the gearbox casing. Low-speed side fork 131 engaged with sleeve 125a is set on low-speed side shift shaft 40. High-speed side fork 132 engaged with sleeve 117a is set on high-speed side shift shaft 42. Similarly, highest gear fork (not shown) is also set on highest gear shift shaft 44. Shift and select shaft 30 are driven by actuator 19 for select which moves it in an axial direction and actuator 20 for shift which turns it as described in FIG. 6. The desired mesh type clutch can be engaged or released by moving the sleeve and the hub which is adjacent to the sleeve.

FIG. 6 is a block diagram showing the configuration of shift/select actuator used for the gear type transmission according to the first embodiment of the present invention. Oil pressure source 15 comprises chiefly electric pump 11, reservoir tank 12, and accumulator 13. The oil pressure generated by electric pump 11 and stored in accumulator 13 forms base pressure. Here, oil pressure sensor 14 is provided on the piping for the base pressure, and start-up/stop of electric pump 11 is controlled by said control means 10 by using a signal from said oil pressure sensor. Actuator 19 for select which moves shift and select shaft 30 in an axial direction is worked with solenoid 18 for select connected with said oil pressure source 30. An electromagnetic flow control valve is used for solenoid 18 for select. Said shift and select shaft 30 can be moved in an axial direction based on the PWM control by said microcomputer which inputs the detection value of a stroke sensor (not shown) engaged with actuator 19 for select.

On the other hand, actuator 20 for shift which turns shift and select shaft 30 is worked by solenoids 16 and 17 for shift connected with said oil pressure source 30. A proportional electromagnetic type pressure control valve is used for said solenoid. Said shift and select shaft 30 can be moved in an axial direction based on the PWM control by said microcomputer which inputs the detection value of a stroke sensor (not shown) engaged with actuator 19 for select. As described above, the fixed gear position can be composed by selectively engaging the mesh type clutch.

Figure 6A:
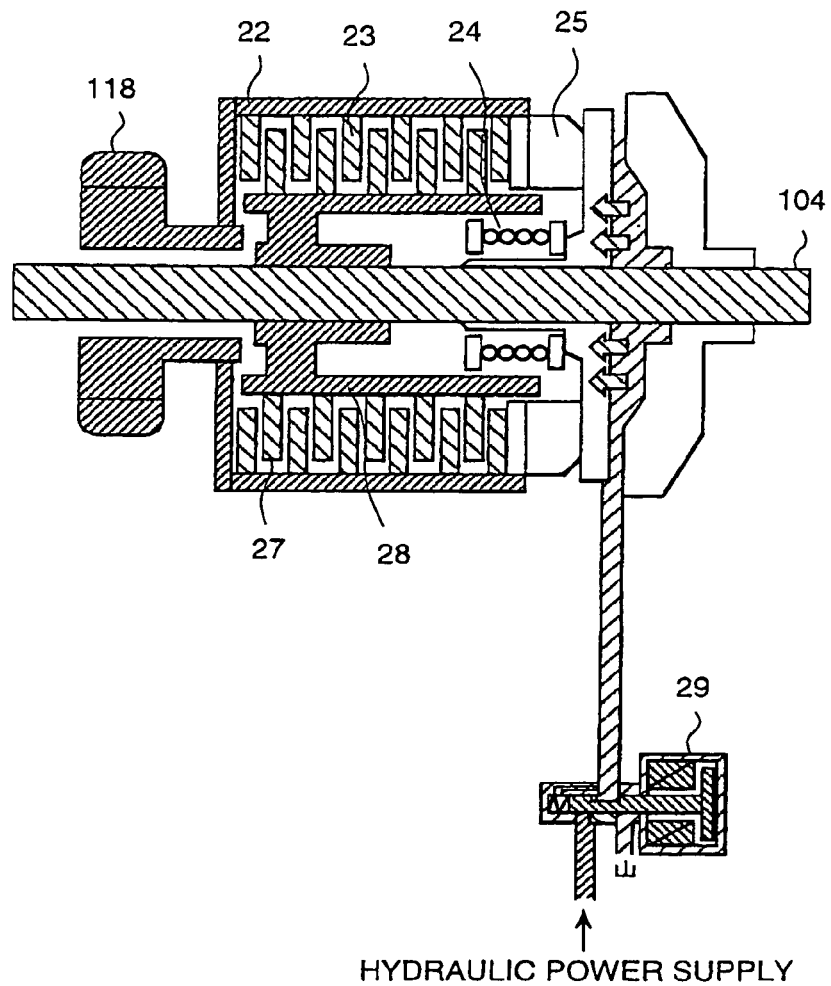
FIG. 6(a) is a partial sectional view showing the configuration of the second friction clutch used for the gear type transmission.

Next, the operation of the second friction clutch in the gear type transmission according to this execution form is explained by using FIG. 6(a). FIG. 6(a) is a partial sectional view showing the configuration of the second friction clutch used for the gear type transmission. The multiplate wet clutch is used for the second friction clutch as shown in the figure. Solenoid 29 for assist generates the oil pressure based on a command signal from said control device 10. A proportional electromagnetic pressure control valve is used for said solenoid 29, and the oil pressure proportional to the electric current which flows to the coil can be generated. Clutch piston 25 resists spring 24 and moves due to the generation of the oil pressure. Drive side plate 23 (rotates in synchronization with an outside drum in the figure) comes in contact driven side plate 27 (rotates in synchronization with output shaft 104) and transfers the power. Driven side plate 27, member 28, and output shaft 104 rotates together. Said solenoid 29 corresponds to assist actuator 7 described in FIG. 1.

Figure 7A:
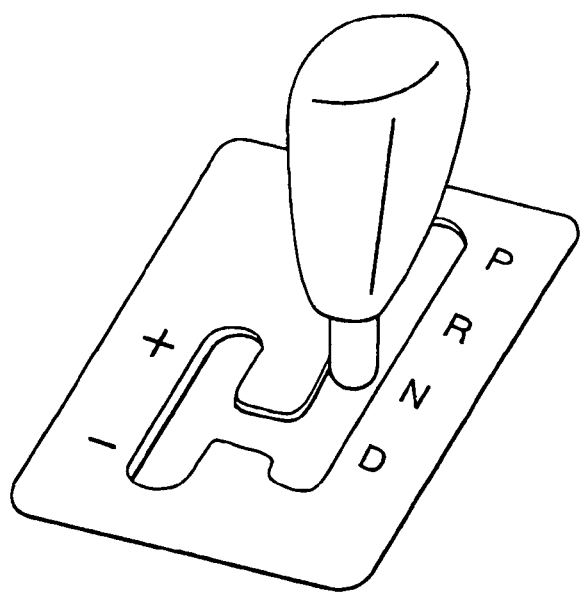
FIG. 7(a) is an outline view of a select lever used as a parking demand means.
Figure 7B:
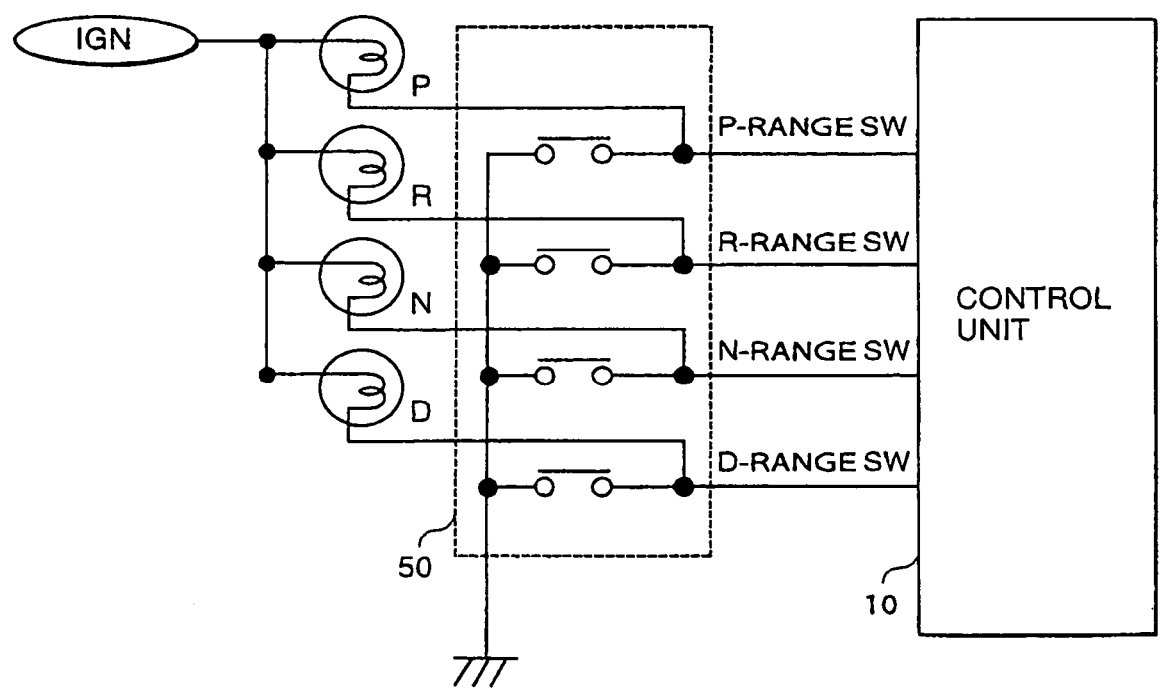
FIG. 7(b) is a schematic view of an inhibitor switch used as a parking demand means.

Assist driven gear 118 is fixed to drive side drum 22. However, this gear runs idle for output shaft 104, and the torque is transferred from assist driven gear 118 to output shaft 104 by engaging the second friction clutch 4. Here, assist driven gear 118 and output shaft 104 rotates at the same speed when the clutch is completely engaged, and the gear type speed change mechanism can obtain the fixed transmission gear ratio (a state of 3rd gear in FIG. 4) by using the second friction clutch. Next, one embodiment of parking demand detecting means 9 used for the control device of the gear type transmission according to this embodiment is explained by using FIG. 7(a) and FIG 7(b). FIG. 7(a) is an outline view of the select lever used as parking demand means 9. Moreover, FIG. 7(b) is a schematic view of the inhibitor switch used as parking demand detecting means 9. P range as well as R range, N range and D range is provided in the select lever shown in FIG. 7(a). When the driver stops the engine, and parks the vehicle, the driver shifts the select lever to P range. Moreover, when the engine starts from the stop state, the select lever is shifted to P range similarly. In synchronization with this operation of the select lever, the signal of inhibitor switch 50 shown in FIG. 9 is generated. The output which corresponds to each range is input from inhibitor switch 50 shown in FIG. 7(b) to control device 10. The signal at a high level when the select lever is not selected and the signal at a low level when the select lever is selected is respectively input to control device 10.

When driver's parking demand or engine starting demand is detected in such configuration, control device 10 executes the processing for locking the vehicle. It is possible to use the operation of the switch dedicated to the parking provided in the automobile interior or the touch panel of the monitor of the navigation system instead of said mechanical hardware as parking demand detecting means 9. That is, it is possible to provide the one like the parking switch in place of the configuration of FIG. 7.

Figure 8A:
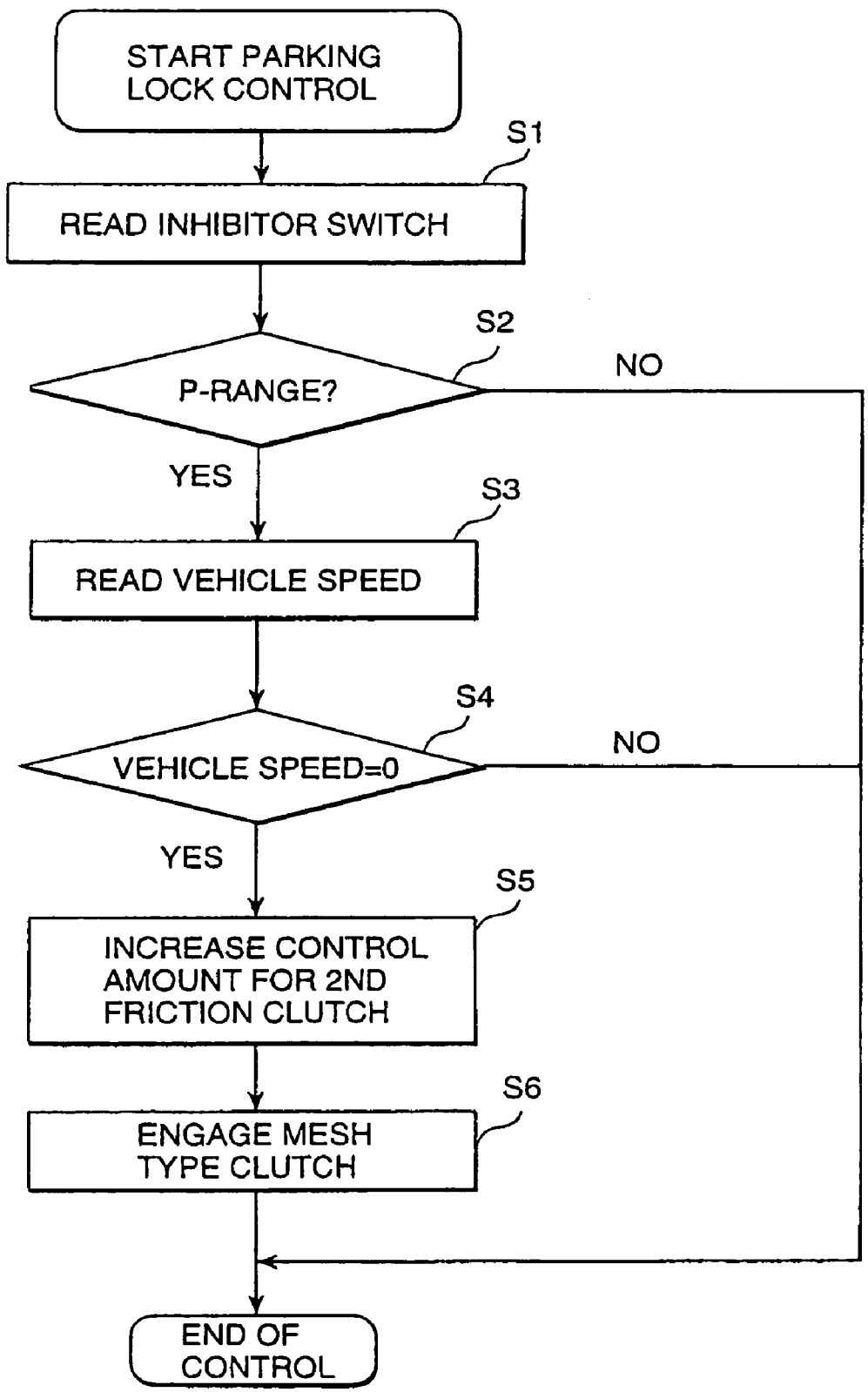
FIG. 8(a) is a flow chart showing a control method by the control device of the gear type transmission.

Next, a method of controlling the gear type transmission according to this embodiment is explained by using FIG. 8 and FIG. 9. FIG. 8(a) is a flow chart showing the control method by the control device of the gear type transmission. This flow chart shows the state when the motor is driving. Moreover, the content of processing shown in the flow chart of FIG. 8(a) is the program built into the microcomputer of control device 10 shown in FIG. 1.

In step S1 of FIG. 8(a), the signal of inhibitor switch 50 shown in FIG. 7(b) is read. Next, it is judged whether the signal of said inhibitor switch 50 indicates the P range which shows the driver's parking demand in step S2. If the P range, the processing advances to step S3, otherwise, the parking lock control processing is ended. Next, the signal of the speed sensor is read in step S3. Next, it is judged whether the vehicle speed read is 0, in a word, whether the vehicle has stopped in step S4. If judged that the vehicle has stopped in step S4, the processing advances to step S5, otherwise, the parking lock control processing is ended. Next, the command signal to solenoid 29 for assist shown in FIG. 6(a) is output so as to engage the second friction clutch 4. As a result, the counter shaft and the output shaft are set to the fixed transmission gear ratio through the assist driven gear and the assist drive gear. Next, the command signal to solenoids 16, 17 for shift and solenoid 18 for select shown in FIG. 5 is output so as to engage the mesh type clutch, and the parking lock control processing is ended in step S6. Thus, the state of double engaging is obtained by engaging both the second friction clutch and the mesh type clutch when driver's parking demand is detected, and the vehicle can surely be locked.

Figure 9A:
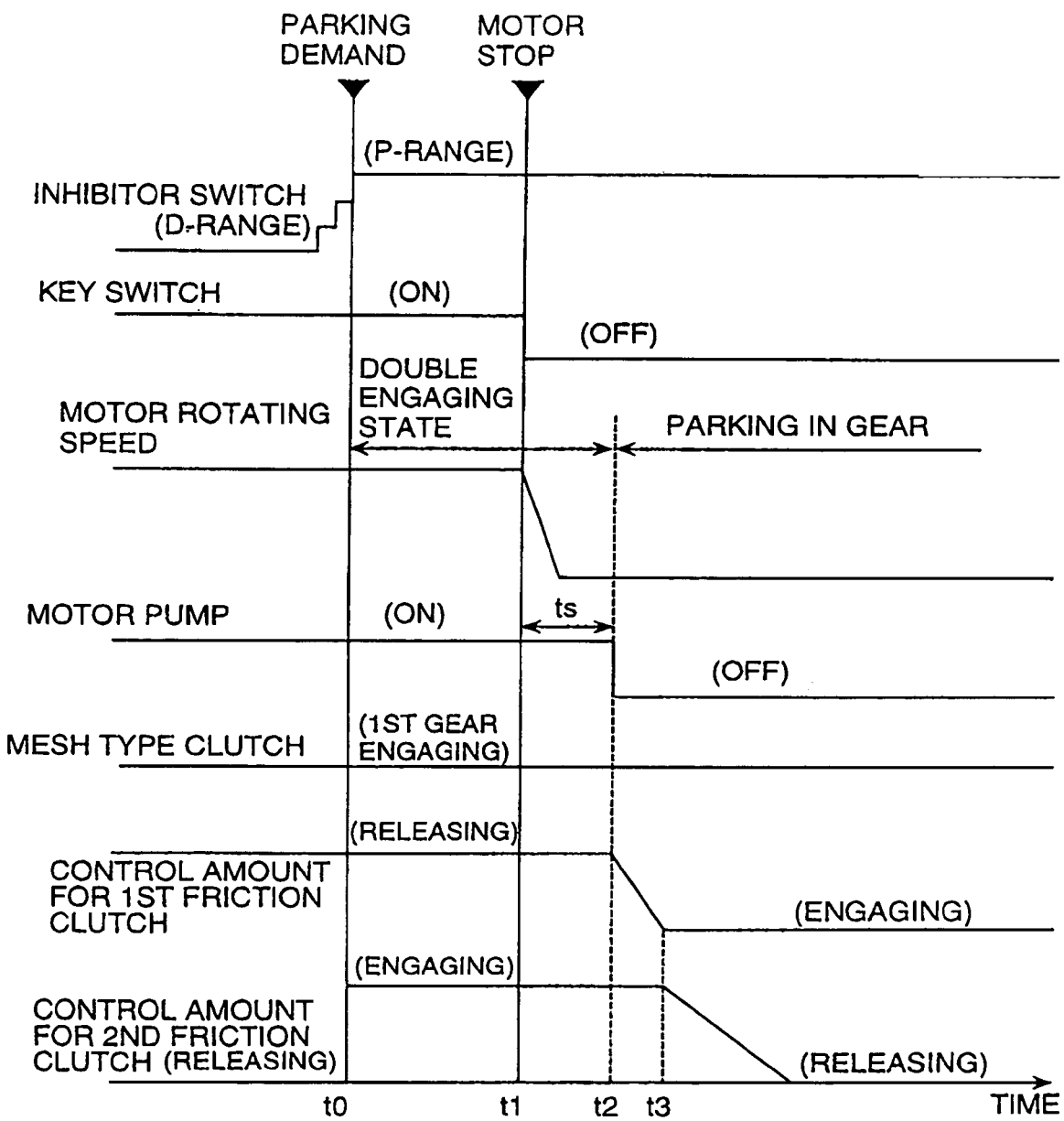
FIG. 9(a) is a time chart showing the operation when the method of controlling the gear type transmission is executed.

FIG. 9(a) is a time chart when said parking lock control processing shown in FIG. 8(a) is executed. When the select lever is operated by the driver and it is detected that the signal of the inhibitor switch indicates the P range at time to, the control amount to the second friction clutch is increased and the complete engaging state is obtained. At this time, the mesh type clutch forms the state of the 1st gear. The double engaging state is obtained by engaging the second friction clutch and the vehicle is locked. Afterwards, when the key switch is turned off by the driver and the motor is stopped, the charge with AC dynamo becomes impossible. Therefore, The discharge pressure of the electric pump decreases by turning off the power supply of said electric pump 11 at time t2 after the predetermined time ts passes. And, the control amount to the second friction clutch decreases due to the decrease in the oil pressure source and the clutch enters the releasing state. On the other hand, the first friction clutch generates the control amount to the clutch by the disc spring. The characteristic is in reverse characteristic from that of the second friction clutch because the clutch is released by releasing this control amount according to the oil pressure. Therefore, the first friction clutch enters the engaging state due to the decrease in the oil pressure source.

Here, it is necessary to decrease the control amount to the second friction clutch at time t3 which the first friction clutch completely engaged, because the lock of the vehicle is imperfect when time that both of friction clutches enter the releasing state exists. As one example of a method of detecting the complete engaging state, there is a way of using a signal from the position sensor installed in the neighborhood of a clutch control mechanism. Because the gear engages mechanically for the movement of the 1st and the 2nd friction clutches as for the mesh type clutch, the clutch is not released due to the decrease in the oil pressure source and the engaging state of the 1st gear can be maintained. Therefore, the vehicle can be locked (park in gear) by making connecting directly the motor and the gear type transmission and using the friction constraint force of the motor to the crankshaft even if the oil pressure source decreases.

Moreover, when the road parked for instance is the uphill, said mesh type clutch engaged is made the forward gear in step S6 shown in FIG. 8(a) to park in gear, and the reverse gear is used besides the uphill. Here, it is possible to detect the road inclination by using the value obtained by presuming the inclination based on the information used for the navigation system or the change of the vehicle speed, etc. as a method of detecting the road inclination. Thus, the vehicle can surely be locked irrespective of the state of the drive or the stop of the motor by switching the gear of the mesh type clutch to be engaged according to the inclination of the road where the vehicle is parked.

Figure 8B:
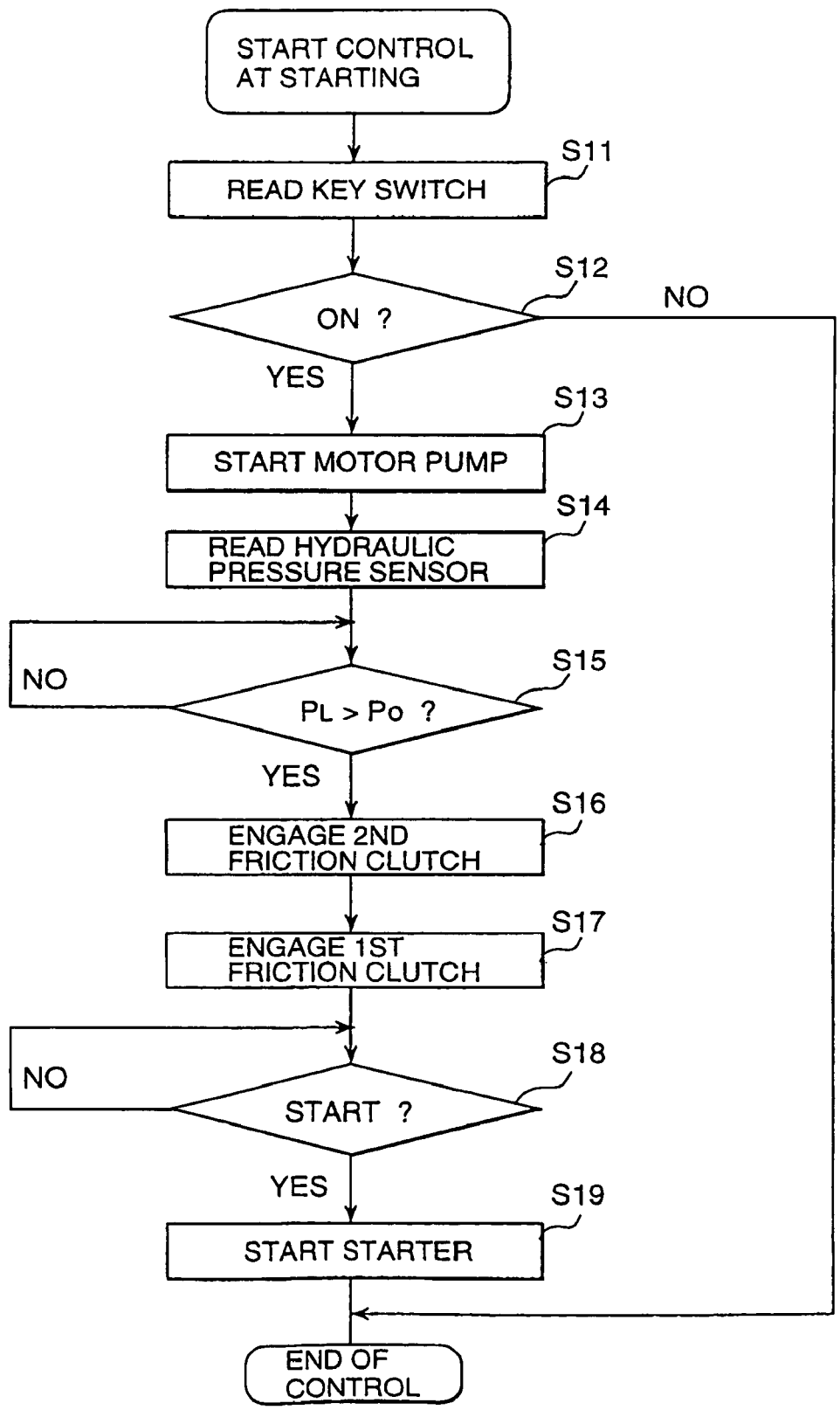
FIG. 8(b) is a flow chart showing a control method by the control device of the gear type transmission.

FIG. 8(b) is a flow chart showing the control method by the control device of the gear type transmission. This flow chart shows the case where the motor starts from the state of the stop. Moreover, the content of processing shown in the flow chart of FIG. 8(b) is th e program built into the microcomputer of control device 10 shown in FIG. 1.

In step S11 of FIG. 8(b), the signal of the key switch provided on the driver's seat side is read. The signal of this key switch is a means which detects the start-up demand of motor 1 by said driver. Next, it is judged whether the signal of said key switch is "ON" in step S12. If "ON", the processing advances to step S13, otherwise, the control processing at start-up is ended. Next, electric pump 11 shown in FIG. 5 is driven in step S13. Next, signal PL of oil pressure-sensor 14 is read in step S14. And, it is judged whether said oil pressure PL stored in accumulator 13 is larger than the predetermined value Po in step S15. If large, the processing advances to S16, otherwise, step S15 is repeated. Next, the command signal to said solenoid 29 for assist of mentioning above is output to engage the second friction clutch 4 in step S16, and the control amount is increased. As a result, the counter shaft and the output shaft are set in the fixed transmission gear ratio through the assist driven gear and the assist drive gear. Here, the state of double engaging is obtained by the processing of step S16 because the mesh type clutch is engaged with the fixed gear position beforehand when motor 1 is stopped according to the flow chart shown in FIG. 8(a).

The first friction clutch 2 is released, and the torque transfer between the motor and the gear type transmission is intercepted in step S17. Next, it is judged whether the signal of said key switch is "START" in step S18. If "START", the processing advances to S18, otherwise, step S18 is repeated. A starter is started in step S19 at the end, and the motor begins to operate and the control at start-up is ended. Here, it is known that the spike-like heavy current is generated when the starter is started and the output voltage of the battery decreases temporarily.

The electric current to release the first friction clutch decreases by this temporary voltage drop, and there is a possibility that the clutch is engaged. Then, it is necessary to adjust the electric current which flows to the first friction clutch to the maximum value or to enlarge it more than the set values of the electric current at the usual releasing operation in said step S18 where the starter is working.

Surely locking the vehicle at the start-up of the motor becomes possible by such a flow chart. Moreover, in the vehicle having a keyless entry system where the switching condition of the door in the vehicle is detected, the release of the door lock or the command of the door lock release is detected to reduce the loss of the time to accumulate the pressure to the accumulator. Further, it is possible to use a control method by which the processing in step S13 (preliminary operation) is executed beforehand by detecting the key being inserted into a key hole. Moreover, in the car which installs a remote starter for controlling the engine starting from a distant place, a similar effect can be achieved by retarding the control beginning by the predetermined time after the engine starting command is originated, and carrying out the preliminary operation in the interim.

Figure 9B:
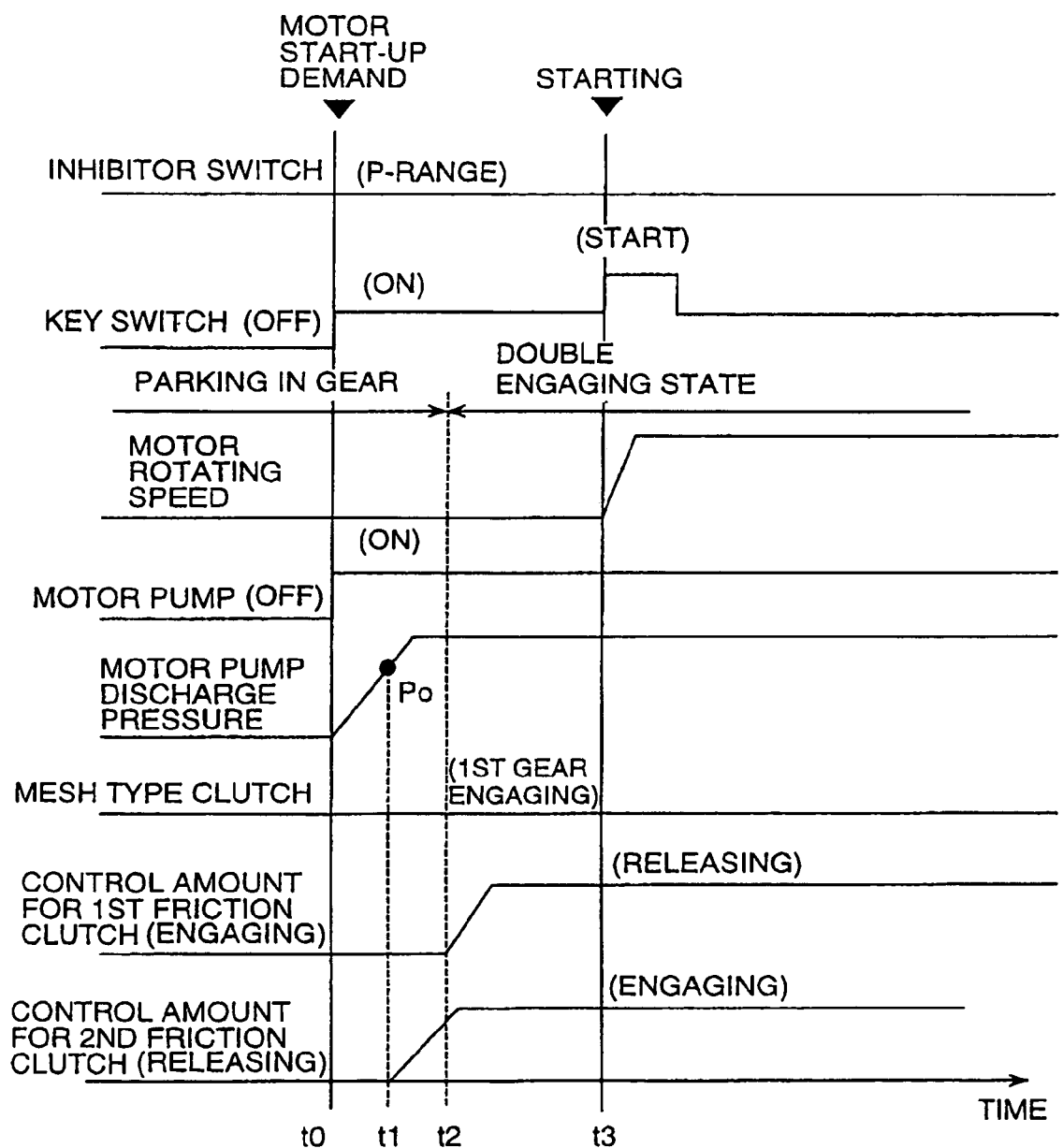
FIG. 9(b) is a time chart showing the operation when the method of controlling the gear type transmission is executed.

FIG. 9(b) is a time chart when the control processing is executed at start-up shown in FIG. 8(b). The signal of the inhibitor switch (neutral switch) shows P range at time to. The key switch is operated by the driver and when it is detected that the signal of the key switch is turning on, electric pump 11 is turned on. The discharge pressure rises by driving electric pump 11, and the control amount to the second friction clutch is increased, and this clutch is brought into be the state of the complete engaging at time t1 which reaches the predetermined pressure Po. And, the control amount to the first friction clutch is raised at the same time the complete engaging of the second friction clutch is detected at time t2 and the first friction clutch is brought into be the state of releasing. Here, there is a method of detecting the oil pressure which acts on the second friction clutch by the oil pressure sensor as one example of a method of detecting the complete engaging of the second friction clutch. If neither of friction clutches is engaged, the lock of the vehicle becomes imperfect. On the other hand, the mesh type clutch forms the gear position where motor 1 is stopped. The state of the double engaging is formed by engaging the second friction clutch, and the vehicle is locked. At time t1, the key switch is turned to START position by the driver and the motor is started. Even when the motor is started from the state of the stop, the vehicle can surely be locked by such a control method.

Figure 6B:
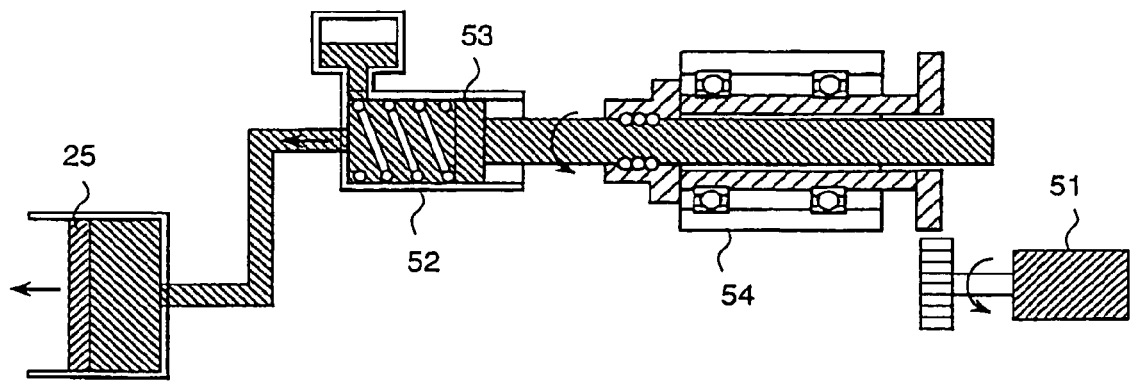
FIG. 6(b) is a block diagram showing the outline of one embodiment of assist actuator used for the control device of the gear type transmission.

Next, one embodiment of the assist actuator used for the control device of the gear type transmission is explained by using FIG. 6(b). FIG. 6(b) is a block diagram showing the outline of one embodiment of assist actuator. DC motor 51 shown in the figure is engaged with ball screw 54 by a gear wheel. The power in a rotation direction of said DC motor 51 is converted into the power in a line direction and amplified. The point of the ball screw is connected with piston 53 of master cylinder 52, and further resists the spring by rotating said DC motor 51 and moves. Said master cylinders 52 are connected to clutch piston 25 of the second friction clutch shown in FIG. 6(a) through the piping. The hydraulic operating fluid is filled in the piping, and said clutch piston 25 moves according to the movement of said piston 53, and the control amount to the second friction clutch 4 is generated. Connecting the clutch electric without using the oil pressure source shown in FIG. 5 becomes possible by such configuration. Moreover, the standby time until the pressure is accumulated in the accumulator at start-up like the processing from step S13 to S15 shown in FIG. 8(b) becomes unnecessary by using such an electric actuator. Therefore, losing the tardiness at start-up becomes possible.

Figure 10A:
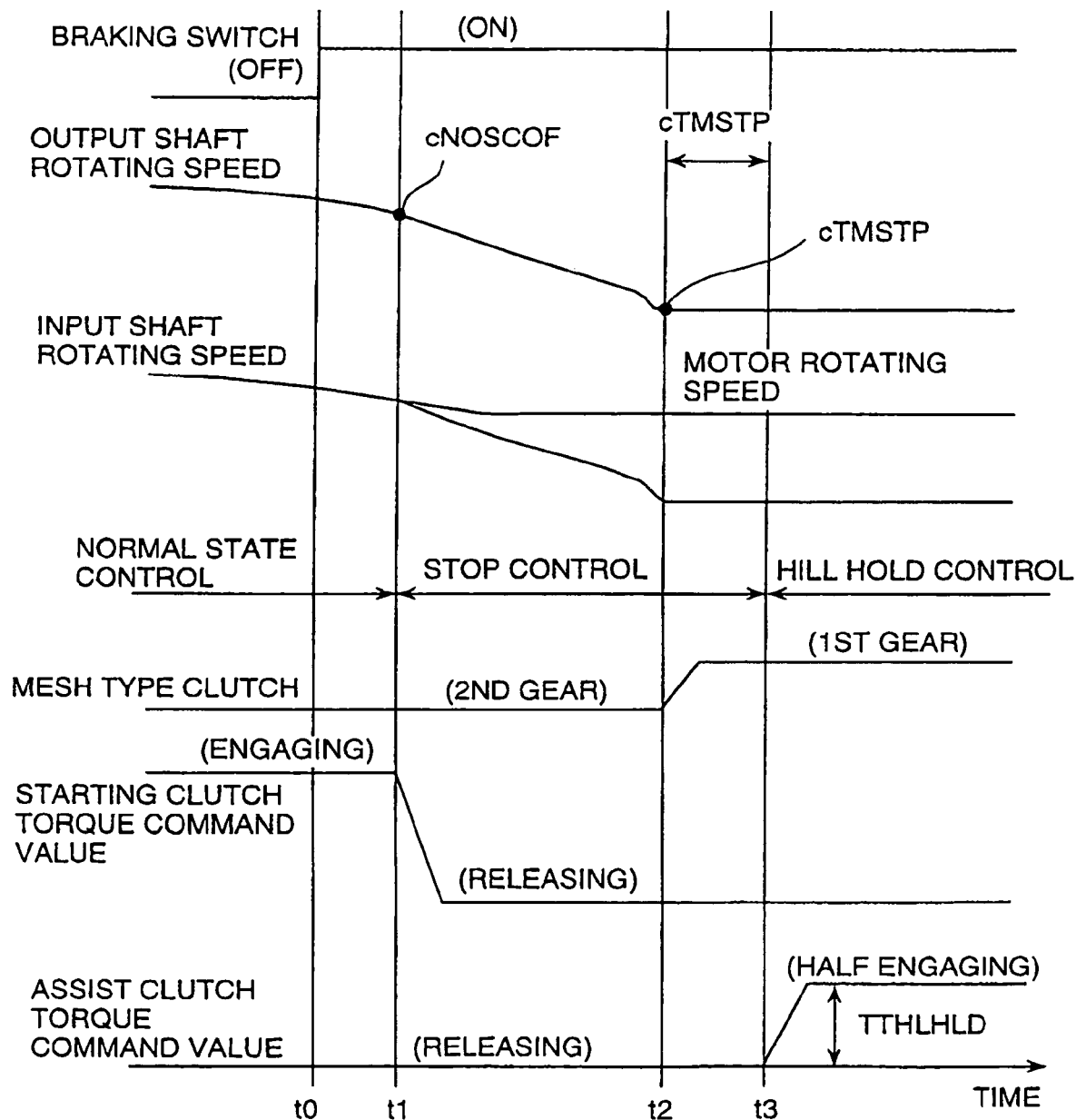
FIG. 10(a) is a time chart showing the operation when the method of controlling the gear type transmission is executed.

FIG. 10(a) is a time chart showing the operation when the control method by the control device of the gear type transmission is executed, which shows the state where the vehicle stops from the state of running by driver's brake operation. The speed of the vehicle, that is, the rotating speed of the output shaft of the transmission decreases when driver makes the brake ON at time t0. At time t1, the clutch torque command value to the first friction clutch (start clutch torque command value) is assumed to be 0 when the output rotating speed falls below the predetermined rotating speed cNOSCOF, and the first friction clutch is released. As a result, the rotating speed of the motor maintains idling speed, and the rotating speed of the input shaft of the transmission decreases according to the rotating speed of the output shaft. Next, the mesh type clutch is changed from the 2nd gear to the 1st gear when the rotating speed of the output shaft decreases up to the fixed rotating speed cNOSTP at time t2, and the preliminary operation for the following start operation is done. And, it is judged that the driver demands the vehicle stop at time t3 which passes predetermined time cTMSTP from said time t2. And, clutch torque command value (assist clutch torque command value) to the second friction clutch is set in the fixed value TTHLHLD to make the second friction clutch half engaging. Thus, maintaining the stopping place of the vehicle becomes possible on the climbing-hill road because the double engaging can be formed in the transmission by allowing the second friction clutch to be the state of half engaging. Such a function is hereinafter called a Hill holding function.

Here, the method of calculating a necessary assist clutch torque instruction value TTHLHLD for said Hill holding function is described. The equation of motion in the input shaft circumference of the transmission is calculated by following equation (1).

$$J \cdot d\omega/dt = Ta - Td/G1 - Ta \cdot Td/G1 \quad (1)$$

J: moment of inertia, $\omega$: Rotating speed of input shaft, Ta: Assist clutch torque command value, Td: Running resistance in output shaft circumference, Gs: Present gear ratio, Ga: Assist gear ratio.

Said running resistance Td shows the value obtained by converting the load which provided to the vehicle like rolling resistance and hill climbing resistance, etc. which is the load provided to the stopping vehicle into the output shaft surroundings of the transmission. Moreover, said assist gear ratio Ga shows the ratio of the gear composed by the gear train in which the second friction clutch is installed. Here, the circulation torque which corresponds to Ta·Td/G1 shown in said equation (1) is generated in the input shaft by generating assist clutch torque command value Ta. And, said circulation torque acts as a load to the torque which tries to rotate the input shaft from the tire side according to running resistance. Therefore, said equation is summarized as the following equation (2), and the assist clutch torque command value TTHLHLD required as a hill holding function is calculated by following equation (2).

$$THLHLD > Td/(Gs - Ga) \quad (2)$$

As described above, the hill holding function can be achieved by calculating the assist clutch torque command value required for the hill holding function, and assuming the second friction clutch to be the state of half engaging. As a result, it becomes possible to reduce driver's brake operation power required to maintain the vehicle position when the car is stopped, and the drivability can be improved.

Figure 10B:
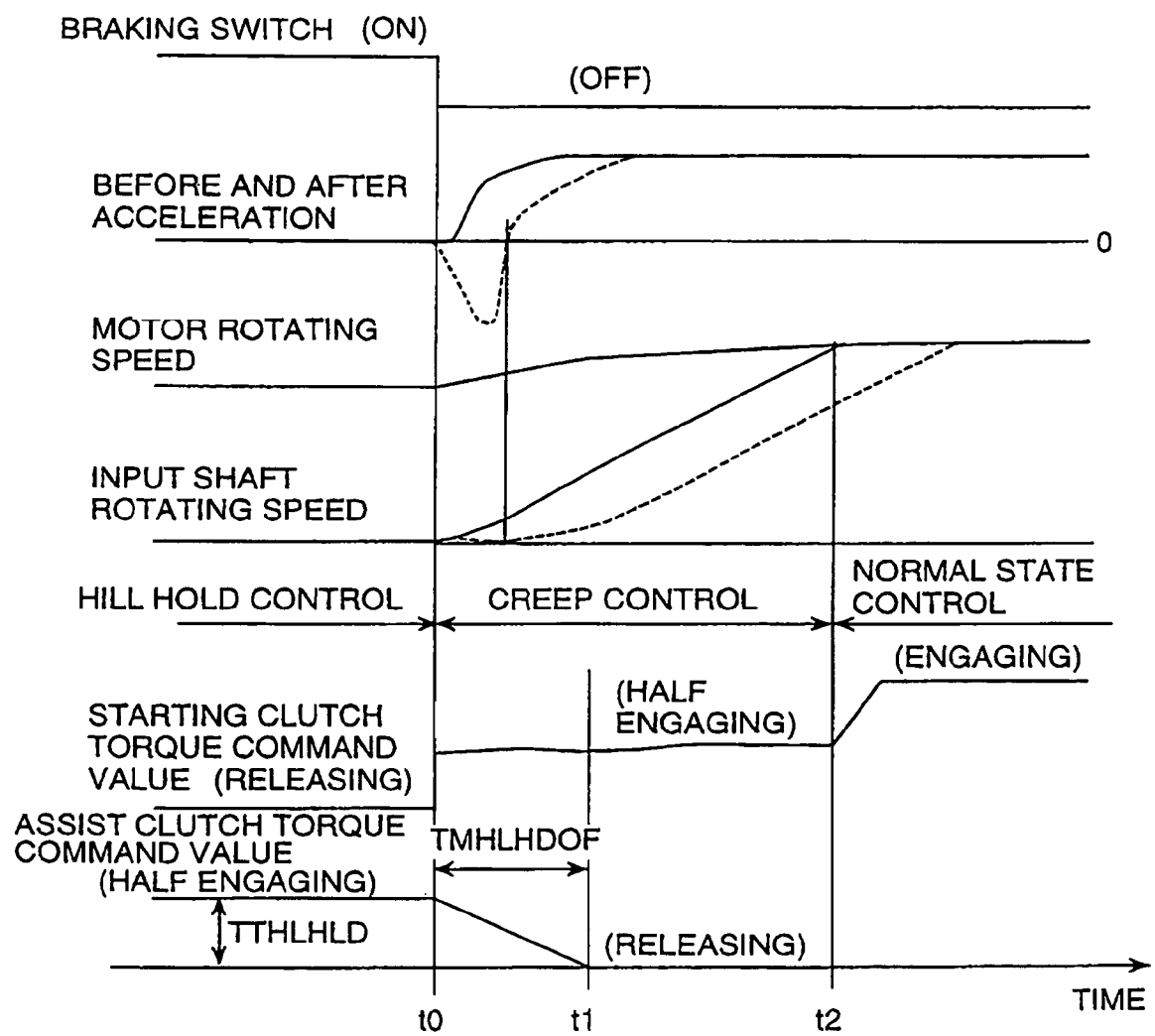
FIG. 10(b) is a time chart showing the operation when the method of controlling the gear type transmission is executed.

FIG. 10(b) is a time chart showing the operation when the control method by the control device of the gear type transmission is executed. This especially shows from the state of the hill holding described in FIG. 10(a) to the state that the vehicle starts by said creep function. The speed change mechanisms such as automatic transmissions with hydraulic torque converter and continuously variable transmissions have a so-called creep function in which the vehicle gradually advances or backs, and generates the fixed drive shaft torque when the driver turns off the brake pedal from the state of the stop. By using said creep function, it becomes possible to perform the start and the stop operation of the vehicle only by brake operation when the driver puts the car in the garage or crawls along in the traffic jam road. The function is acknowledged as an easy drive function by the user. A similar creep function can be achieved in the gear type transmission of the present invention. Concretely, the creep function is achieved by doing the feedback control so that the first friction clutch may be made to be the state of the half engaging, and the rotating speed of the motor may be maintained at a fixed rotating speed. The first friction clutch enters the state of the half engaging when the driver's brake operation is released from the state of the stop, and the creep operation is begun at time t0 shown in FIG. 10(b). Here, the delay time will exist by the time the wheel begins rotating because there is a response delay until an actual clutch torque is generated even if the start clutch torque command value is set in step to assume the state of said half engaging. Therefore, as shown by the dotted line in FIG. 10(b), the back and forth acceleration temporarily becomes negative by the running resistance during the delay of the response until the record clutch torque is generated, and the retrogression of the vehicle is occurred in the start operation from the stop on the climbing-hill road. Thus, the phenomenon that the vehicle moves backward when changing from the stop of the vehicle to the creep condition on the climbing-hill road is generated. This has the possibility not only to give the driver the sense of incompatibility but also to cause the contact accident with the following car. However, the second friction clutch is made to be the state of the half engaging with the car stopped as mentioned above in the present invention, and the clutch torque necessary to maintain the vehicle position is generated. As shown by the solid line in FIG. 10(a), the vehicle can promptly begin advancing because the torque by which the vehicle position is maintained at time t0 when brake operation was released is acted. Therefore, the vehicle is prevented from moving backward as mentioned above.

Here, when the value calculated according to the total weight of the vehicle and the road inclination obtained by detection or presumption is used as running resistance Td in said output shaft circumference, a more accurate hill holding function is given. However, because the addition of a new sensor for calculating the running resistance leads to the increase of the cost, the cheap configuration can be used, in which the running resistance Td set beforehand is corrected by the learning control.

As described above, reducing driver's brake operation power becomes possible by allowing the second friction clutch to be the state of the half engaging and forming the state of the double engaging with the mesh type clutch when the state that the vehicle has stopped is maintained. Moreover, when starting from the stop on the climbing-hill road, it become possible to prevent the vehicle from moving backward temporary.

The wheel can surely be locked even in an automatic manual transmission according to the present invention as explained above.

The invention claimed is:

1. A control device of a gear transmission arranged to transfer power from an engine of a vehicle via a first friction clutch and a transmission input shaft to a transmission output shaft, the transmission including:
   two or more gear trains provided between the input and output shafts, mesh clutches provided on at least one of said gear trains, and
   a second friction clutch provided on at least one of said gear trains, said second friction clutch being arranged to transfer power from said motor to the output shaft during shifting,
the control device comprising:
   a gear position detector, said gear position detector detecting gear positions formed by engagement of said mesh clutches;
   a stop demand detector, said stop demand detector detecting a stop demand from operation of brakes of the vehicle; and an output shaft rotating speed detector, said output shaft rotating speed detector detecting a rotating speed of the output shaft, wherein said second friction clutch engagement is started when said gear position detector detects a predetermined gear position, the output shaft rotating speed detector detects a rotating speed equal to or less than a predetermined rotating speed, and the stop demand detector detects brake operation for more than a predetermined time.

2. A control method of a gear transmission arranged to transfer power from an engine of a vehicle via a first friction clutch and a transmission input shaft to a transmission output shaft, the transmission including:

two or more gear trains provided between the input shaft and the output shaft, mesh clutches provided on at least one of said gear trains, and a second friction clutch provided on at least one of said gear trains, said second friction clutch being arranged to transfer power from said motor to the output shaft during shifting, the control method comprising the steps of:

detecting gear positions formed by engagement of said mesh clutches;

detecting a stop demand from vehicle brake operation;

detecting a rotating speed of the output shaft; and initiating engagement of said second friction clutch when a detected gear position is a predetermined gear position, a detected output shaft rotating speed is equal to or less than a predetermined rotating speed, and a brake operation is detected for more than a predetermined time.

3. A control device of a gear transmission arranged to transfer power from an engine of a vehicle via a first friction clutch and a transmission input shaft to a transmission output shaft, the transmission including:

two or more gear trains provided between the input and output shafts, mesh clutches provided on at least one of said gear trains, and a second friction clutch provided on at least one of said gear trains, said second friction clutch being arranged to transfer power from said motor to the output shaft during shifting, the control device comprising:

a gear position detector, said gear position detector detecting gear positions formed by engagement of said mesh clutches;

a stop demand detector, said stop demand detector detecting a stop demand from operation of brakes of the vehicle; and an output shaft rotating speed detector, said output shaft rotating speed detector detecting a rotating speed of the output shaft, wherein said second friction clutch engagement is started when said gear position detector detects a predetermined gear position, the output shaft rotating speed detector detects that a rotating speed equal to or less than a predetermined rotating speed, and the stop demand detector detects brake operation, and upon starting said second friction clutch engagement, a fastening force applied by the second friction clutch increases to a predetermined force level over a predetermined engagement time interval.

4. A control method of a gear transmission arranged to transfer power from an engine of a vehicle via a first friction clutch and a transmission input shaft to a transmission output shaft, the transmission including:

two or more gear trains provided between the input shaft and the output shaft, mesh clutches provided on at least one of said gear trains, and a second friction clutch provided on at least one of said gear trains, said second friction clutch being arranged to transfer power from said motor to the output shaft during shifting, the control method comprising the steps of:

detecting gear positions formed by engagement of said mesh clutches;

detecting a stop demand from vehicle brake operation;

detecting a rotating speed of the output shaft; and starting engagement of said second friction clutch when a detected gear position is a predetermined gear position, a detected output shaft rotating speed is equal to or less than a predetermined rotating speed, and a brake operation is detected, wherein upon starting said second friction clutch engagement, a fastening force applied by the second friction clutch increases to a predetermined force level over a predetermined engagement time interval.

5. A control device of a gear transmission arranged to transfer power from an engine of a vehicle via a first friction clutch and a transmission input shaft to a transmission output shaft, the transmission including:

two or more gear trains provided between the input and output shafts, mesh clutches provided on at least one of said gear trains, and a second friction clutch provided on at least one of said gear trains, said second friction clutch being arranged to transfer power from said motor to the output shaft during shifting, the control device comprising:

a gear position detector, said gear position detector detecting gear positions formed by engagement of said mesh clutches;

a stop demand detector, said stop demand detector detecting a stop demand from operation of brakes of the vehicle; and an output shaft rotating speed detector, said output shaft rotating speed detector detecting a rotating speed of the output shaft, wherein said second friction clutch engagement is started when said gear position detector detects a predetermined gear position, the output shaft rotating speed detector detects that a rotating speed equal to or less than a predetermined rotating speed, and the stop demand detector detects brake operation for more than a predetermined time, and when the vehicle is on an incline facing uphill one of said mesh clutches for engaging a forward gear is engaged, and when the vehicle is an incline facing downhill one of said mesh clutches for engaging a reverse gear is engaged.

6. A control method of a gear transmission arranged to transfer power from an engine of a vehicle via a first friction clutch and a transmission input shaft to a transmission output shaft, the transmission including:

two or more gear trains provided between the input shaft and the output shaft, mesh clutches provided on at least one of said gear trains, and a second friction clutch provided on at least one of said gear trains, said second friction clutch being arranged to transfer power from said motor to the output shaft during shifting, the control method comprising the steps of:
- detecting gear positions formed by engagement of said mesh clutches;
- detecting a stop demand from vehicle brake operation;
- detecting a rotating speed of the output shaft; and
- initiating engagement of said second friction clutch when a detected gear position is a predetermined gear position, a detected output shaft rotating speed is equal to or less than a predetermined rotating speed, and a brake operation is detected for more than a predetermined time, wherein when the vehicle is on an incline facing uphill one of said mesh clutches for engaging a forward gear is engaged, and when the vehicle is an incline facing downhill one of said mesh clutches for engaging a reverse gear is engaged.

* * * * *